Oct. 12, 1937.  L. G. S. BROOKER  2,095,854
PHOTOGRAPHIC EMULSION CONTAINING TRICARBOCYANINES
Filed Jan. 16, 1933
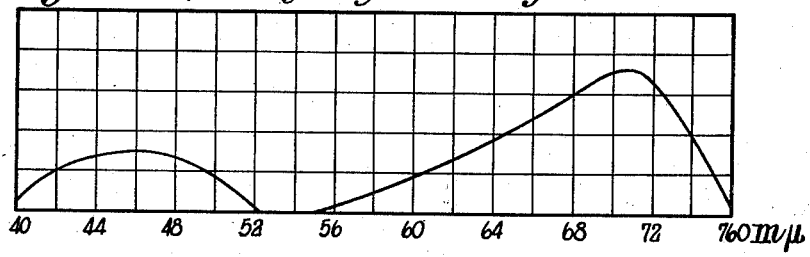
Fig.1. 3,3'-Diethyl-thiazolinotricarbocyanine iodide.
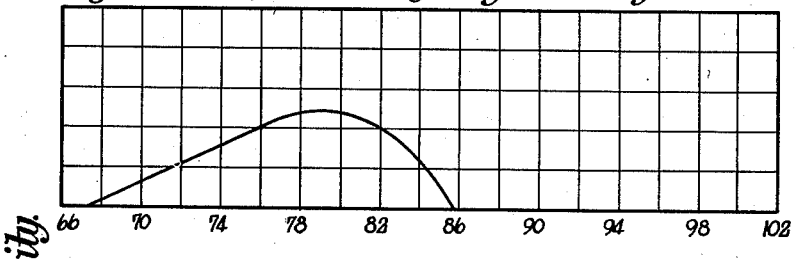
Fig.2. 3,4,3',4'-Tetramethyl-thiazolotricarbocyanine bromide.
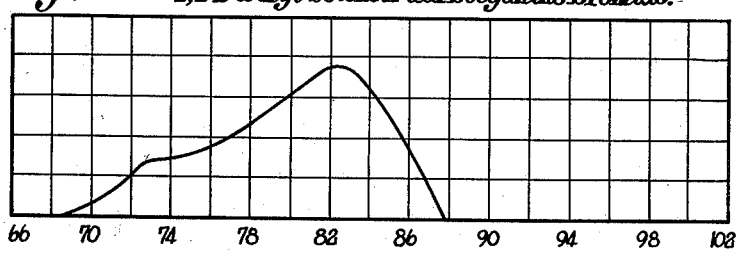
Fig.3. 2,2'-Diethyl-selenotricarbocyanine bromide.
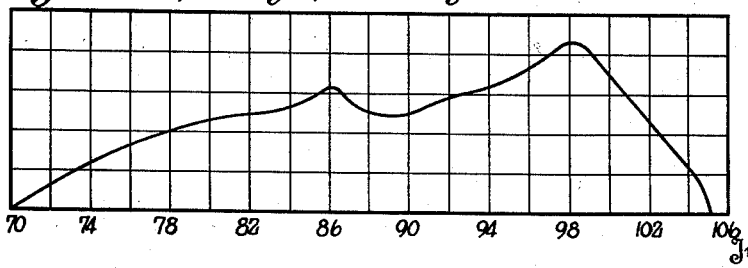
Fig.4. 1,1'-Dialkyl-4,4'-tricarbocyanine iodide.
Inventor:
Leslie G. S. Brooker,
By Daniel J. Mayne
Newton M. Perriss
Attorneys Patented Oct. 12, 1937

2,095,854

UNITED STATES PATENT OFFICE 2,095,854

PHOTOGRAPHIC EMULSION CONTAINING TRICARBOCYANINES

Leslie G. S. Brooker, Rochester, N. Y., assignor, by mesne assignments, to Eastman Kodak Company, Jersey City, N. J., a corporation of New Jersey Application January 16, 1933, Serial No. 652,029

10 Claims. (Cl. 95—7)

This invention relates to photographic emulsions, and more particularly to gelatino-silver halide emulsions, sensitized to the deep and infra-red regions of the spectrum by certain tricarbocyanine dyes, which are cyanine dyes containing a seven-methenyl chain.

Novel tricarbocyanines which I have found useful are the thiazolinotricarbocyanines, the thiazolotricarbocyanines, the selenotricarbocyanines and the 4,4'-tricarbocyanines. The latter is unique in that it sensitizes emulsions further into the infra-red than any dye heretofore known or suggested. Other tricarbocyanines which I have found useful for sensitizing photographic emulsions are the thiotricarbocyanines, the benzothiotricarbocyanines and the 2,2'-tricarbocyanines.

It is an object of my invention to provide photographic emulsions and/or elements sensitive to the infra-red region of the spectrum. Other objects will hereinafter appear.

To utilize the sensitizing properties of these dyes one merely incorporates the dye in the photographic emulsion, which it is desired to sensitize such as a gelatino-silver-halide emulsion, or the photographic element coated with the emulsion may be bathed in, or coated with, a solution of the dye.

The dyes herein referred to are fully disclosed, with appropriate examples of their preparation, in my copending applications Serial Nos. 651,870 and 652,030, filed of even date herewith.

The constitution of these dyes is illustrated by the following formulas. For instance the thiazolinotricarbocyanines, which are derived from the condensation of two thiazoline nuclei, by the methods disclosed in my above applications, have the following formula—

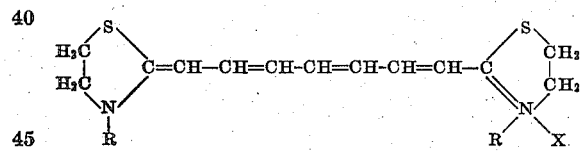

where R=alkyl, such as methyl, ethyl, etc. and X=acidic radical, such as halide, etc.

The thiazolotricarbocyanines have the general formula—

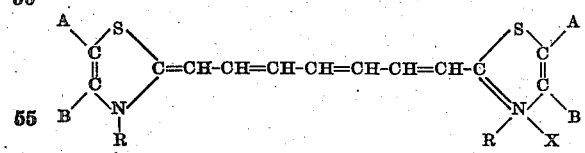

where A and B are monovalent substituent atoms or groups such as hydrogen, methyl, phenyl, etc. and R and X have the significance given above.

The selenotricarbocyanines have the general formula—

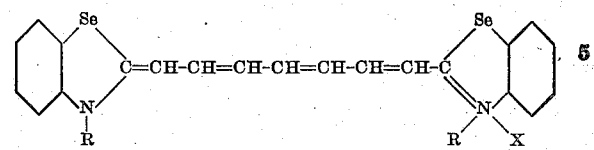

where R and X have the significance given above. It will be seen that substituent groups may be introduced into the available positions in the benzene rings of the benzoselenazole nuclei of the dye without departing from the scope of this invention, provided that the introduction of such substituent groups does not strongly depress the sensitizing action of the dye.

The 4,4'-tricarbocyanines are derived from alkyl quaternary salts of lepidine and have the following general formula—

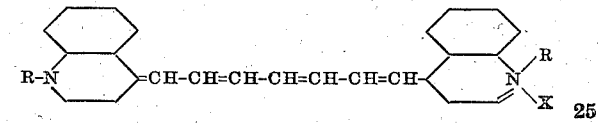

where R and X have the significance given above. The lepidine nucleus may or may not be substituted, as for instance by such groups as methyl or ethoxy.

The following examples, taken from my above referred to copending applications, serve to illustrate the preparation of the tricarbocyanine dyes employed in my invention. These examples are not intended to limit my invention.

EXAMPLE 1

2,2'-Diethylselenotricarbocyanine bromide 2 parts (2 mols) of 1-methylbenzoselenazole are heated for a day with 2 parts (2 mols) of ethyl p-toluenesulfonate at 100°. The product is dissolved in 12 parts of absolute ethyl alcohol, the solution chilled in ice-water, 1.4 parts of glutaconic aldehyde dianilide hydrochloride added followed by 0.85 parts (2 mols) of piperidine. The dye is rapidly formed and the whole is allowed to stand for several hours at room temperature or somewhat lower. The dye is then precipitated with aqueous potassium bromide, collected, washed clean with water followed by acetone, and purified by recrystallization from methyl alcohol. It separates in beautiful green needles and gives a deep greenish blue solution.

EXAMPLE 2

1,1'-Diethyl-4,4'-tricarbocyanine iodide 12 parts (2 mols) of lepidine ethiodide were dissolved in 25 parts of absolute ethyl alcohol and the solution chilled in a freezing mixture with stirring, so as to obtain very small crystals of the quaternary salt. 5.6 parts (1 mol.) of glutaconic aldehyde dianilide hydrochloride were then added, with cooling and shaking. A dark coloration rapidly developed and the whole was stood aside in the ice box overnight. Next morning the muddy liquors were filtered off, the residue washed with acetone until most of the tarry impurities had disappeared, followed by water and then more acetone. The residue was next boiled with a small quantity of methyl alcohol, cooled and filtered, and this treatment repeated once or twice until the filtrate was clear green color and the dye on the filter looked clean. It then consisted of coppery crystals and gave a somewhat dull green solution. The dye could be successfully recrystallized from methyl alcohol, especially if the hot liquors were chilled so as to expose the dye to the action of the hot alcohol for as short a time as possible.

Lepidine methiodide, treated in the same fashion (11.4 parts are required) gave the dye 1,1'-dimethyl-4,4'-tricarbocyanine iodide. This was recrystallized from methyl alcohol and obtained as a dark brown crystalline powder, and the color of the solution was olive green. Lepidine alliodide similarly yielded 1,1'-diallyl-4,4'-tricarbocyanine iodide, which was obtained in beautiful reddish coppery crystals. Triethylamine (2 mols) could be substituted for the piperidine used in the above method.

Example 3

*2,2'-Diethylthiazolinotricarbocyanine iodide*

5.1 parts (2 mols) of 2-methylthiazoline were heated for 4 hours at 100° with 10 parts (2 mols) of ethyl-p-toluenesulfonate. The yellowish viscous product was used without further purification, being dissolved in 25 parts of ethyl alcohol, the solution well chilled in a freezing mixture, 7 parts (1 mol.) of glutaconic aldehyde dianilide hydrochloride added to the solution followed by 4.3 parts (2 mols) of piperidine. There was an instant very dark coloration and the whole was stood aside in the ice box overnight. Crystals of the p-toluenesulfonate of the dye separated on stirring in 70 parts of cold ether. The ethereal layer was poured off and the residue stirred with 40 parts of acetone and filtered. The yield of air-dried dye is around 80%. The dye is then dissolved in hot methyl alcohol (25 parts) and precipitated by adding a solution of excess of potassium iodide (10 parts) in hot water (25 parts). The steely crystals could be crystallized from methyl alcohol in which they dissolved with a deep blue color.

Example 4

*3,3'-Diethylthiazolotricarbocyanine iodide*

2-methylthiazole etho-p-toluenesulfonate is prepared by heating 4 parts (2 mols) of 2-methylthiazole with 8 parts (2 mols) of ethyl p-toluenesulfonate for 30 hours at 100°. The product is dissolved in 20 parts of absolute ethyl alcohol, the solution chilled in ice water, 5.6 parts (1 mol.) of glutaconic aldehyde dianilide hydrochloride added and then 3.4 parts (2 mols) of piperidine. The whole is well shaken and stood in the ice box for about 120 hours. The deep blue liquid is then mixed with an excess of cold aqueous potassium iodide and the die is precipitated, removed by filtration and washed with water. It is then treated with acetone, in which it dissolves readily, and on standing or on rubbing with a glass rod the dye separates out in beautiful greenish bronze crystals relatively insoluble in the solvent. These crystals are removed and may be recrystallized from methyl alcohol, the color of the solution being deep blue. The dye is then obtained in green needles, some facets of which reflect blue light and others brassy-green light.

Example 5

*3,4,3',4'-Tetramethylthiazolotricarbocyanine bromide*

12 parts (2 mols) of 2,4-dimethylthiazole metho-p-toluenesulfonate (made by condensing together equimolecular proportions of 2,4-dimethylthiazole and methyl p-toluenesulfonate) are dissolved in 24 parts of hot absolute ethyl alcohol, the solution rapidly chilled in a freezing mixture, 5.6 parts (1 mol.) of glutaconic aldehyde dianilide hydrochloride added, 3.4 parts (2 mols) of piperidine, the whole well shaken, and stood aside for 6 days at 0–10° C. with occasional shaking. The dye separates out and is removed by filtration at the end of the period, impurities being removed by washing with acetone followed by water. The dye (probably the p-toluenesulfonate) forms a dull green powder which may be recrystallized from methyl alcohol, or, the methyl alcoholic solution may be treated with excess of aqueous potassium bromide, when the bromide of the dye separates out. This may be removed and recrystallized from methyl alcohol and it separates in green lustrous crystals which give a deep blue solution.

Example 6

*3,3'-Dimethylthiazolinotricarbocyanine iodide*

2 parts of 2-methylthiazoline are heated at 100° C. for 20 minutes with 3.7 parts of methyl p-toluenesulfonate to produce 2-methylthiazoline metho-p-toluenesulfonate (2 mols). This salt is dissolved in 25 parts of pyridine, the solution cooled and 3.6 parts (1 mol.) of 2-iodopyridine ethiodide added and the mixture kept at room temperature for 5 days with occasional shaking. The dye is then thrown out of solution by adding much ice water and is removed by filtration. It may be recrystallized from methyl alcohol in which it gives an intense blue solution and is obtained in blue grey crystals.

Example 7

*2,2'-Diethylthiotricarbocyanine iodide*

3.05 parts (2 mols) of 1-methylbenzothiazole ethiodide are dissolved in 40 parts of boiling absolute ethyl alcohol and the solution rapidly chilled with ice water to bring about crystallization with production of small crystals. 1.4 parts (1 mol.) of glutaconic aldehyde dianilide hydrochloride is then added, followed by 1 part (2 mols) of triethylamine. The whole is kept near 0° C. for about 2 days with occasional shaking. The dye is then filtered off, washed with acetone followed by hot water and dried. The yield is around 70%.

Other bases such as n-butylamine, piperidine, tri-n-butylamine may be used, and all give good yields of the dye.

If 1-methyl-α-naphthothiazole ethiodide (2 mols) is used in place of the quaternary salt used above, the dye obtained is 2,2'-diethyl-5,6,5',6'-dibenzothiotricarbocyanine iodide which crystallizes in coppery crystals which give a green solution in alcohol.

EXAMPLE 8

1,1'-Diethyl-2,2'-tricarbocyanine iodide 6.9 parts (2 mols) of quinaldine etho-p-toluenesulfonate, 2.8 parts (1 mol.) of glutaconic aldehyde dianilide hydrochloride and 22 parts of absolute ethyl alcohol are mixed up together and the suspension chilled in a mixture of ice and concentrated hydrochloric acid. 1.7 parts (2 mols) of piperidine are then added, with shaking and the whole kept at about 0° C. for a day. At the end of this time crystals had separated. These were dissolved in hot methyl alcohol, precipitated with aqueous potassium iodide and the reaction filtrate similarly treated. The total amount of crude dye was collected on a filter and washed with successive lots of hot acetone and finally hot-methyl alcohol to remove tars and bluish impurities. When the filtrate was a clear green color washing was discontinued. The yield of crude dye amounts to 2.6 parts (49%). On slow crystallization from methyl alcohol, magnificent brassy crystals were obtained. The yield of recrystallized material was 2.3 parts (43%).

The diagrammatic spectrograms constituting the accompanying drawing illustrate the regions of the spectrum to which the various types of dyes herein disclosed will sensitize a gelatino-silver-halide emulsion and the extent of the sensitization at various wave lengths. The figures of this drawing and the dyes, the sensitizing properties of which they illustrate, are as follows—

Fig. 1. 3,3'-diethyl-thiazolinotricarbocyanine iodide.

Fig. 2. 3,4,3',4'-tetramethyl-thiazolotricarbocyanine bromide.

Fig. 3. 2,2'-diethyl-selenotricarbocyanine bromide.

Fig. 4. 1,1'-dialkyl-4,4'-tricarbocyanine iodide.

The sensitization resulting from the various other dyes herein referred to and belonging to the respective classes of dyes above illustrated are all comparable to the sensitization illustrated as resulting from the specific dyes named in connection with these figures.

The preparation of gelatino-silver-halide emulsions are well known to those skilled in the art. To sensitize such emulsions I prepare a stock solution of the dye by dissolving the dye in alcohol. Then in one liter of the emulsion I thoroughly incorporate, normally, a volume of the stock solution which contains from approximately ⅕ to one mg. of the dye and spread the emulsion upon a suitable support, such as glass or cellulose derivative sheeting, to a suitable thickness and allow it to dry. Photographic elements so prepared are best stored in the cold and at all stages in the handling and mixing of the dye solution or emulsions containing it the temperature should be kept as low as possible without jelling the emulsion. This is due to the inherent instability of these dyes at elevated temperatures.

The amount of dye which is actually incorporated in a given quantity of emulsion will, of course, vary from dye to dye and emulsion to emulsion, as is known to those skilled in the art. The above figures are, therefore, to be regarded only as illustrative as it may be necessary in some cases to use more or less of the dye, than I have above indicated.

Under the class of gelatino-silver-halide emulsions I, of course, include all of the silver halides customarily employed in the art but more particularly the silver chloride and silver bromide emulsions.

What I claim as my invention and desire to be secured by Letters Patent of the United States is:

1. A gelatino-silver-halide emulsion sensitized with a dye selected from the group consisting of thiazolotricarbocyanines, thiazolinotricarbocyanines, and selenotricarbocyanines.

2. A gelatino-silver-halide emulsion sensitized with a thiazolinotricarbocyanine dye.

3. A gelatino-silver-halide emulsion sensitized with a selenotricarbocyanine dye.

4. A gelatino-silver-halide emulsion sensitized with a 3,3'-dialkylthiazolinotricarbocyanine salt.

5. A gelatino-silver-halide emulsion sensitized with a 1,1'-dialkylselenotricarbocyanine salt.

6. A gelatino-silver-halide emulsion sensitized with a 3,3'-dialkylthiazolinotricarbocyanine iodide.

7. A gelatino-silver-halide emulsion sensitized with a 1,1'-dialkylselenotricarbocyanine iodide.

8. A photographic element comprising a supporting surface coated with a gelatino-silver-halide emulsion sensitized with a dye selected from the group consisting of thiazolotricarbocyanines, thiazolinotricarbocyanines, and selenotricarbocyanines.

9. A gelatino-silver-halide emulsion sensitized with 2,2'-diethylselenotricarbocyanine bromide.

10. A gelatino-silver-halide emulsion sensitized with 3,3'-diethylthiazolinotricarbocyanine iodide.

LESLIE G. S. BROOKER.